Figure 1:
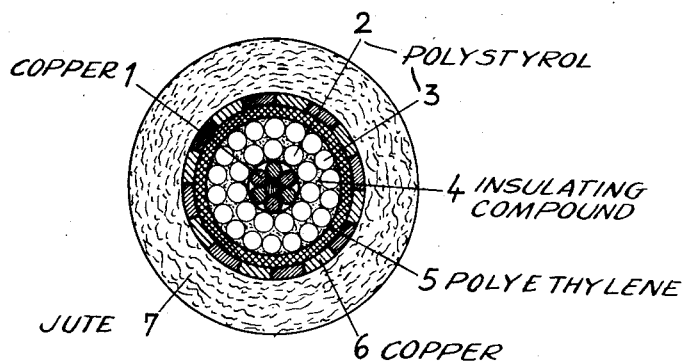

Feb. 10, 1959     H. HORN     2,873,307
DEEP SEA SUBMARINE CABLE
Filed May 7, 1954

Inventor
H. Horn

United States Patent Office 2,873,307
Patented Feb. 10, 1959

2,873,307
DEEP SEA SUBMARINE CABLE

Heinz Horn, Koln-Mulheim, Germany, assignor to Felten & Guilleaume Carlswerk Aktiengesellschaft, Koln-Mulheim, Germany Application May 7, 1954, Serial No. 428,280

Claims priority, application Germany August 26, 1953

2 Claims. (Cl. 174—102)

Submarine cables used, for instance, for the transmission of normal telegraphic currents generally consist of a copper conductor, an insulation and, if necessary, also of a water-tight cable sheathing and an armouring of steel wires. In the case of submarine cables for the transmission of high frequency currents, a copper return conductor is additionally provided under the armouring.

In the case of cables used along the coast, the armouring fulfills a double purpose: Firstly, it enables the laying of the cable by taking up the tensional forces and, secondly, it protects the cable against damage by the anchor of the ship, by friction along the rocky bottom, or the like. In contradistinction thereto, in the deep sea the cable lies completely at rest at a depth where the influences above mentioned do not exist. In this case, the armouring serves only for taking up tensional forces during the laying and is important only once more when the cable has to be taken up again for the purpose of repairs.

Bearing in mind the laying ships that are at one's disposal and considering the difficulties encountered during the laying of heavy cables in great sea depths, it is endeavoured to make the cables as thin and as light as possible. However, when use is made of steel wires of great strength for the outer armouring, the weights are always considerable in the case of great water depths. The diameter, and therewith the weight, of the armouring necessarily become still greater if, following the present-day tendency, the damping of the cable is to be reduced.

In order to reduce the weight of the cable, it has already been proposed to make the armouring of a light insulating material, whereby the strength of the latter with respect to the specific weight shall be as great as possible. It is known to use profile strands of polystyrol as the armouring material. It has been found that, owing to its small specific weight, the tearing length of a polystyrol strand is a multiple of the tearing length of steel wire. In water it amounts to about 140 klm.

However, in the case of such cables, there is the economical disadvantage that these armouring strands are too expensive and constitute a substantial part of the price of the cable, but, after the laying of the cable in great water depth, they have no further function to fulfill. For this reason, deep sea cables have not been laid up to the present with armouring strands made of a synthetic material.

It would therefore be desirable to manufacture a deep sea cable in which in order to fulfil the task of the armouring, other constructional elements of the deep submarine cable could be used.

It has already been proposed to use the inner conductor, which in the case of submarine cables generally consists of pure copper for the purpose of taking up the tensional forces during the laying. However, since the carrying length of copper in water is only 2500 meters, in the case of the known deep sea cables, in which the inner conductor is used to take up the tensional forces, use is not made of pure copper but of a copper alloy of correspondingly greater strength. Of course, this alloy has the disadvantage that its conductivity is substantially smaller as compared with that of pure copper.

According to the invention, use is made of a submarine cable, more particularly a deep sea cable, in which the insulation is made of such tensional strength that it takes up the function of the armouring of a deep sea cable, so that the outer armouring can be dispensed with.

This construction of cable has substantial advantages as compared with the known deep sea cables. On the one hand, use can be made of an inner conductor which is of pure copper and of the best conductivity and, on the other hand, outer armouring wires are rendered superfluous, so that the diameter and the weight can be reduced even in the case of cables with small damping to such an extent that they can be handled with the laying ships and laying means which are at one's disposal. Moreover, there is the advantage that the strands which are used for taking up the tensional forces do not lie uselessly at the bottom of the sea after the laying but constitute a portion of the insulation.

The insulation has to be such, that it is capable of supporting itself and the cable during the laying without the cable being torn. The use of polystyrol as insulating material has been found to be especially advantageous in this case. On the one hand, the cable weight is thereby substantially reduced for the same tensional strength and, on the other hand, the elastic behaviour of this substance is such that the copper conductor cannot be excessively extended.

The polystyrol is preferably used in a stretched condition, in the form of a strand of circular or profile shape stretched on one side, or in the form of a band stretched on both sides. In order that their tensional strength may be fully utilised the strands or bands of polystyrol have to be applied with a long lay on the central copper conductor. The strands or bands have to substantially fill up the intermediate spaces between the central copper conductor and an outer cylindrical and water tight sheathing, for instance of polyethylene. Any spaces left between the strands or bands are preferably filled by a viscous insulating material, for instance a mixture of polyethylene and polyisobutylene, in order that the hydrostatic pressure of the water shall be uniformly distributed. The advantage of bands stretched on both sides, as compared with strands of polystyrol stretched on one side only, is that the bands have a substantially higher resistance to pressure owing to the stretching on both sides.

In order to obtain a cable which does not twist, it has been found advisable in the case of insulating strands stranded in a number of layers to strand them with alternating direction of lay from layer to layer.

As regards the cable sheathing, use may advantageously be made, for instance, of polyethylene and to apply the outer conductor on the cable sheathing in the form of copper wires and bands. It is also advantageous to use a metal cable sheathing, for instance, an aluminium tube, which may serve at the same time as a return conductor.

Figure 2:
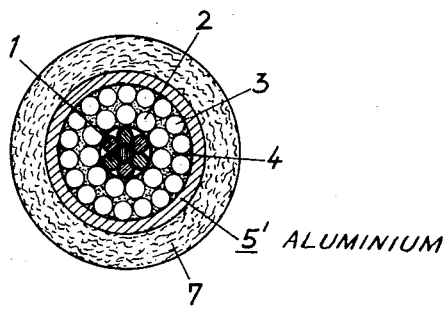

The invention is illustrated, by way of example, in connection with the constructions shown in Figures 1 and 2 of the accompanying drawings.

According to Figure 1, the cable core consists of a conductor 1 comprising one or a number of copper wires, on which there is stranded a layer of polystyrol strands 2 with a long lay. Thereon there is stranded a further layer of polystyrol strands 3, also with a long lay, but in the opposite direction. The intervening spaces between the copper conductor and the polystyrol wires are filled with an insulating compound 4. This compound may for instance consist of a mixture of polyethylene and polyisobutylene. The cable is surrounded by a water-tight sheathing 5, which may preferably consist of polyethylene. Flat copper wires 6 are then stranded over the cable sheathing to act as a return conductor. There also follows as is known per se, one or two layers of jute 7. Outer armouring wires are not provided.

Figure 2 shows another example of construction according to the invention. The same differs from the example of construction shown in Figure 1 only by this that, instead of the cable sheathing of polyethylene, use is made of a sheathing 5' of aluminium or aluminium alloy. The sheathing can then serve at the same time as a return conductor, so that the use of flat copper wires 6 is rendered superfluous.

I claim:

1. As a new article of manufacture, a deep submarine cable without the usual protective covering, consisting of an inner conductor, a combined insulation and tension-absorbing armouring means around said conductor consisting of inner and outer superimposed layers of polystyrene profiled strands stretched on both sides with different lay directions and a relatively long laying length and of such great tensile strength to serve also as an armor for the cable without the use of additional armouring steel wires, a water-tight sheathing around said insulation, a viscous insulating mixture of polyethylene and polyisobutylene in the spaces between the said strands, the inner conductor, and the sheathing, and an outer return conductor around the water-tight sheathing.

2. A submarine cable as claimed in claim 1, characterized by that the cable sheathing consists of polyethylene.

References Cited in the file of this patent

UNITED STATES PATENTS

| 271,548 | Trott | Jan. 30, 1883 |
| 1,756,546 | Gilbert | Apr. 29, 1930 |
| 2,005,273 | Studt | June 18, 1935 |
| 2,131,987 | Studt et al. | Oct. 4, 1938 |

FOREIGN PATENTS

| 437,917 | Great Britain | Nov. 7, 1935 |
| 799,063 | France | Mar. 23, 1936 |

OTHER REFERENCES

Modern Plastics (publication), July 1944, page 92. (In Div. 69.) 174–110.4.